United States Patent

Onodera

Patent Number: 5,736,635
Date of Patent: Apr. 7, 1998

[54] POSITION SENSOR

[75] Inventor: Ichiro Onodera, Miyagi-ken, Japan

[73] Assignee: Alps Electric Co., Ltd., Tokyo, Japan

[21] Appl. No.: 767,269

[22] Filed: Dec. 16, 1996

[30] Foreign Application Priority Data

Dec. 22, 1995 [JP] Japan .................................. 7-335128

[51] Int. Cl.$^6$ .................................................. G01M 15/00
[52] U.S. Cl. .......................................... 73/118.2; 123/337
[58] Field of Search .................................. 73/1.16, 23.32, 73/118.2, 117.2, 117.3, 118.1; 123/337, 403

[56] References Cited

U.S. PATENT DOCUMENTS

| | | | |
|---|---|---|---|
| 5,092,296 | 3/1992 | Gunter et al. | 123/337 |
| 5,144,277 | 9/1992 | Ishihara et al. | 338/164 |
| 5,567,874 | 10/1996 | Suzuki et al. | 73/118.2 |
| 5,571,960 | 11/1996 | Tateishi et al. | 73/118.2 |

*Primary Examiner*—George M. Dombroske
*Assistant Examiner*—Eric S. McCall
*Attorney, Agent, or Firm*—Guy W. Shoup

[57] ABSTRACT

A position sensor for a throttle valve, the position sensor including a housing having a partition wall separating an attachment chamber and a sensor accommodating chamber, each of which include an outer opening. The partition wall defines a central opening. The housing is connected to a case of the throttle valve such that the outer opening of the attachment chamber is closed by the throttle valve case. A drive shaft of the throttle valve is connected to a driven shaft mounted in the attachment chamber, the driven shaft being rotatably supported on the partition wall. A sliding-element receiver is located within the accommodating chamber and is connected through the central opening in the partitioning wall to the driven shaft. The driven shaft and the sliding-element receiver cooperate to close the central opening of the partition wall. A insulating substrate is disposed within the accommodating chamber opposite to the sliding-element receiver. A cover is mounted over the outer opening of the accommodating chamber and attached to the housing with thermosetting resin, thereby sealing the opening of the accommodating chamber. A communicating hole is provided in the partition wall of the housing and connecting the accommodating chamber with the attachment chamber, whereby the communicating hole provides the only passage into the accommodating chamber through which air escapes from the accommodating chamber when the thermosetting resin is heated. In one embodiment, the communicating hole is tapered between the accommodating chamber toward the attachment chamber.

4 Claims, 2 Drawing Sheets

POSITION SENSOR

BACKGROUND OF THE INVENTION

1. Field of the Invention

The present invention relates to a position sensor for detecting the position of the operating part of an equipment body and, more particularly, to a throttle position sensor suitable for use in an external environment including water and dust, such as a throttle position sensor for a motor vehicle.

2. Description of the Related Art

Generally, in a motor vehicle like a gasoline automobile, the optimal quantity of fuel to be supplied is set in accordance with the running speed of the motor vehicle; and a position sensor referred to as the throttle position sensor is utilized to ensure operation at the optimal fuel consumption.

As an example of this type of throttle position sensor disclosed in Japanese Utility Model Laid-Open No. Hei 4-8401, a position sensor has been known in which, after the installation of a sensor body comprising a sliding element receiver and a resistance substrate in an accommodating chamber formed in a housing, an opening of the accommodating chamber is covered with a cover and a gap between the opening of the accommodating chamber and the cover is sealed with a thermosetting resin. The known position sensor is provided with a communicating hole connecting a connector section formed integrally with the housing and the accommodating chamber, to thereby allow the escape, out of the connector section, of air expanded within the accommodating chamber by utilizing the communicating hole when the thermoserring resin for sealing is heated for setting. Thus it becomes possible to restrain a pressure rise within the accommodating chamber at the time of heating to set the thermosetting resin for the purpose of preventing bubble generation in the thermosetting resin.

According to the aforesaid prior art, an external connector is inserted into the connector section after the mounting of the position sensor to an equipment body on a motor vehicle, and therefore it is possible to keep a certain degree of dust-proofness and water-proofness of the communicating hole provided inside the connector section. However, there is such a problem that when the connector section is disposed under an environment condition susceptible to the effect of dust and water, such foreign substances as water and dust easily enter the gap between the connector section and the external connector, reaching the accommodating chamber interior via the communicating hole; the contact section of the sensor body in the accommodating chamber, therefore, will be adversely affected.

SUMMARY OF THE INVENTION

In view of the foregoing problem inherent to the prior art, it is an object of the present invention to provide a highly reliable position sensor capable of reliably preventing the entrance of foreign substances, such as water and dust, into the accommodating chamber of the housing.

A communicating hole connecting the accommodating chamber with the attachment chamber is drilled in a partition wall of the housing, and the attachment chamber is provided in a closed state to the equipment body. In the position sensor having the communicating hole in the partition wall of the housing, when the opening of the accommodating chamber is sealed with the cover during assembling of the position sensor, the air in the accommodating chamber which has been expanded with the heat of the thermoserring resin is allowed to escape out of the housing through the communicating hole in the partition wall, thereby enabling to prevent the occurrence of bubbles in the thermosetting resin. If the attachment chamber of the housing is installed in a closed state to the equipment body when the position sensor after completion of assembling is installed, the interior of the attachment chamber is separated from the outside, and therefore it is possible to reliably prevent the entry of foreign substances, such as water and dust, into the accommodating chamber through the communicating hole if the position sensor is disposed in an environment in which the throttle position sensor is susceptible to the effect of dust and water.

The position sensor of the present invention comprises a housing wherein an attachment chamber and accommodating chamber are separated by a partition wall, the attachment chamber, with the interior thereof closed, being mounted to the equipment body; an operating shaft rotatably supported in the partition wall; a sliding-element receiver connected to the operating shaft within the accommodating chamber; an insulating substrate disposed oppositely to the vicinity of the sliding-element receiver within the accommodating chamber; a cover sealed with the thermosetting resin with the opening of the accommodating chamber closed; and a communicating hole provided in the partition wall of the housing, for connecting the accommodating chamber with the attachment chamber.

The communicating hole is gradually tapered as it extends toward the attachment hole from the accommodating chamber side in order that foreign substances will not be easily allowed to enter the communicating hole from the attachment chamber side of the housing.

The foregoing object and other objects, as well as the actual construction and operation of the throttle position sensor according to the present invention, will become more apparent and understandable from the following detailed description thereof, when read in connection with the accompanying drawings.

DESCRIPTION OF THE PREFERRED EMBODIMENT

A preferred embodiment of a throttle position sensor according to the present invention will hereinafter be described with reference to the accompanying drawings.

Figure 1:
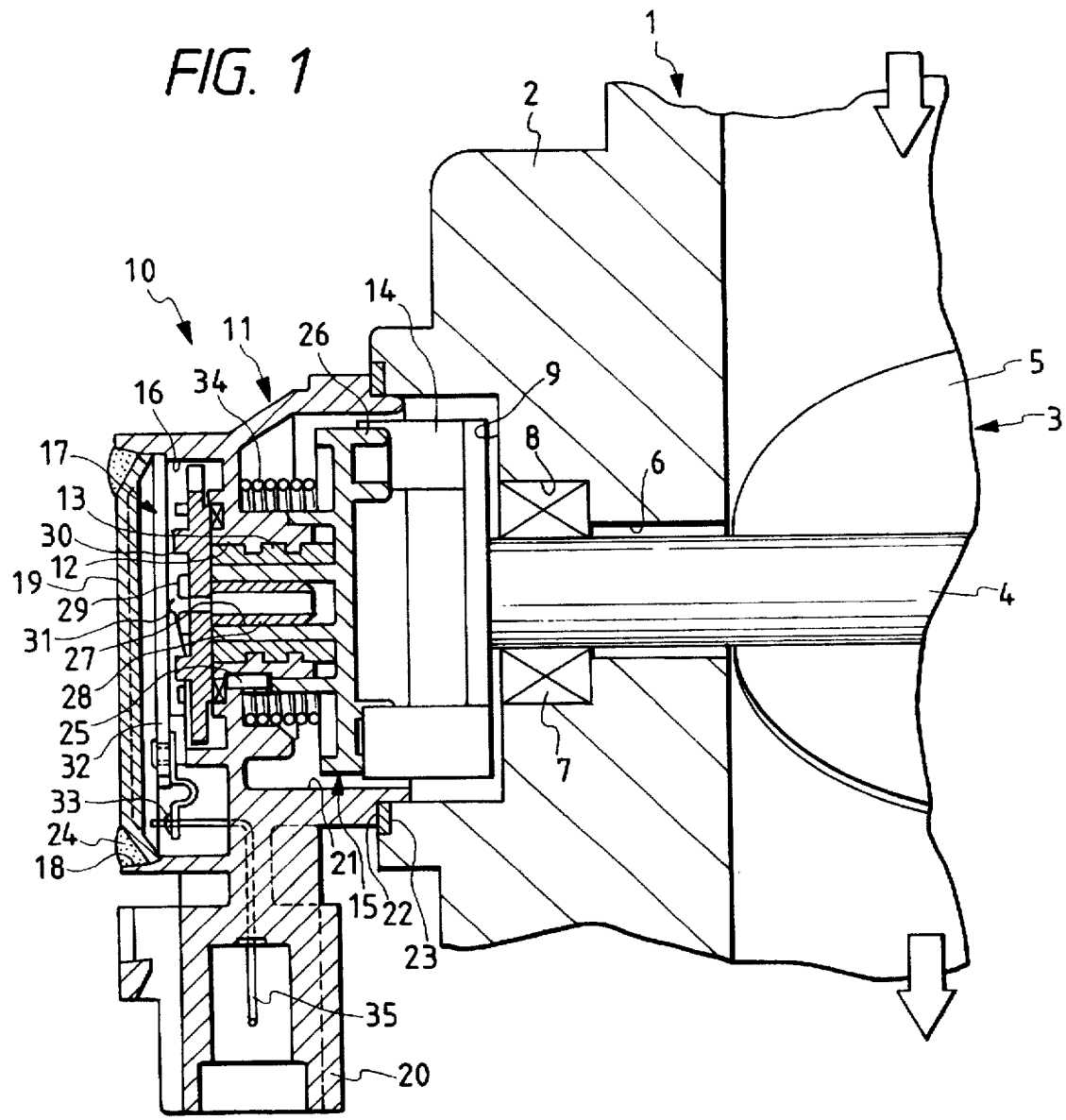
FIG. 1 is a sectional view of one embodiment of a throttle position sensor according to the present invention.
Figure 2:
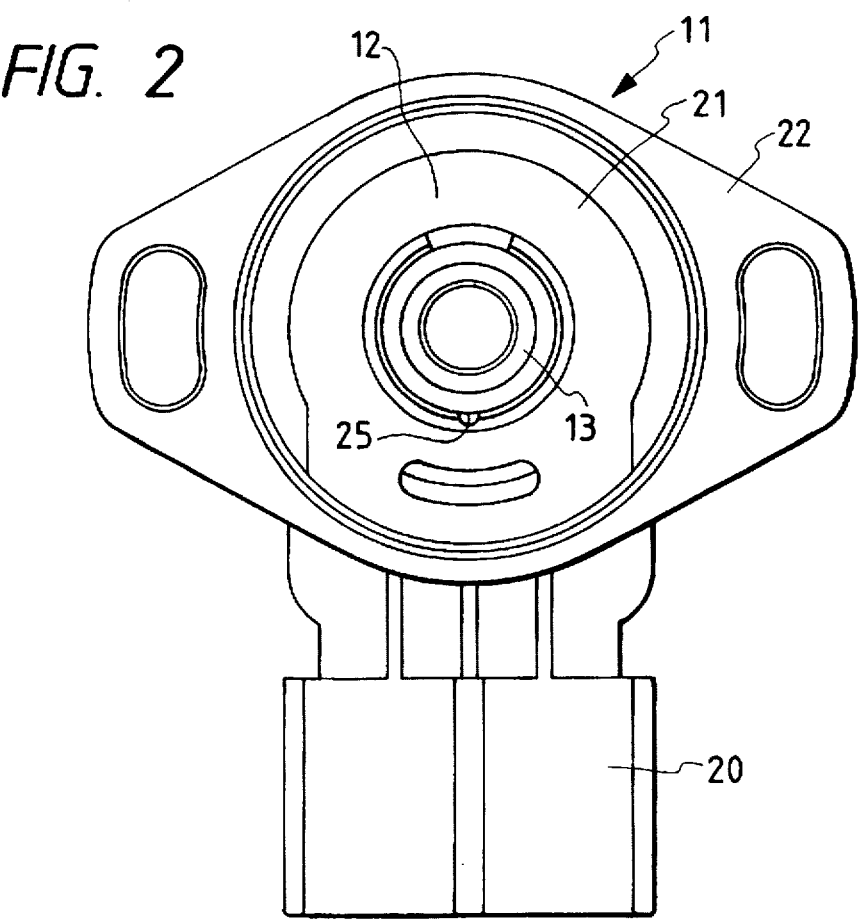
FIG. 2 shows a housing provided in the throttle position sensor as viewed from the attachment chamber side.
Figure 3:
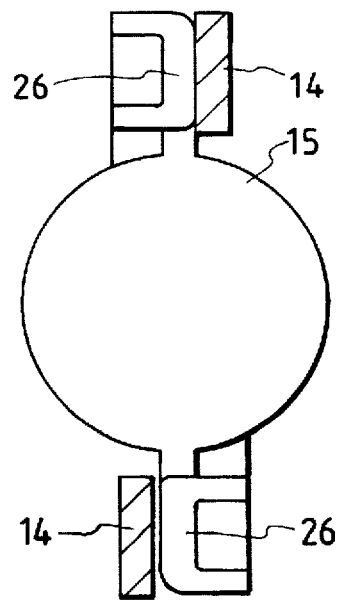
FIG. 3 is an explanatory view showing the state of engagement of the projecting portion of an operating shaft provided in the throttle position sensor with a driving section.

As shown in FIG. 1, the throttle valve 1 mounted on a motor vehicle comprises a case 2 disposed on the intake air side of the engine, and an operating section 3 rotatably mounted in the case 2. The operating section 3 comprises a driving shaft 4 inserted in a direction intersecting the case 2 and rotating in accordance with the amount of depression of an unillustrated accelerator pedal, and an opening-closing plate which is integrally mounted on the driving shaft 4 and opens and closes the interior of the case 2. The case 2 is provided with an insertion hole 6 drilled for inserting the end portion of the driving shaft 4; on the outer end part of this insertion hole 6 is provided a large-diameter part 8 in which a bearing 7 is fitted. Outside of the large-diameter part 8 a concave section 9 is formed. From the bottom surface of the concave section 9 the end portion of the driving shaft 4 protrudes, and the driving shaft 4 is rotatably supported on the bearing 7. In the throttle valve 1 thus constituted the opening-closing plate 5 of the operating section 3 opens and closes in accordance with the amount of depression of the accelerator pedal, thereby regulating the amount of air to be supplied to the engine via the interior of the case 2.

A throttle position sensor 10 used as the position sensor is primarily comprised of a housing 11 mounted on the case 2 of the equipment body, namely the throttle valve 1; a bearing 13 fitted in a central opening of a partition wall 12 of the housing 11; a driven shaft 15 rotatably supported on the bearing 13 and driven through a driving section 14 mounted on the end portion of the driving shaft 4; a sensor body 17 housed in an accommodating chamber 16 of the housing 11; a cover 19 for covering an opening 18 of the accommodating chamber 16; and a connector section 20 protruding downward of the housing 11.

The housing 11 and the connector section 20 are formed as one body of an insulating material such as a synthetic resin. The housing 11 has on one end side an attachment chamber 21 having an opening which is closed when the housing 11 is mounted on the case 2 and on the other end side the accommodating chamber 16 and the opening 18; between the attachment chamber 21 and the accommodating chamber 16 the partition wall 12 is formed. A gap between a mounting surface 22 around the attachment chamber 21 and the case 2 is closed by a plate-like gasket 23. The opening 18 is covered with the cover 19, and a gap formed between the opening 18 and the cover 19 is sealed with the thermosetting resin 24 such as epoxy. In the partition wall 12 of the housing 11 a communicating hole 25 connecting the accommodating chamber 16 to the attachment chamber 21 is provided along the axial direction of the driven shaft 15.

The driven shaft 15 is disposed in such a position that its center axis agrees with the center axis of the driving shaft 4 of the throttle valve 1; a pair of projecting portions 26 which are engaged with the driving section 14 are provided on one end of the driven shaft 15; and a hole 27 is provided along the axial direction at the central part of the other end of the driven shaft 15.

The sensor body 17 is comprised of a sliding-element receiver 30 with a projecting portion 28 connected to the other end of the driven shaft 15 and fitted in the hole 27, an insulating substrate 32 on which an unillustrated conductive pattern in sliding contact with a sliding element 31 of the sliding-element receiver 30, and a signal line 33 for leading a signal out from the conductive pattern. The sliding-element receiver 30 is securely caulked to the other end of the driven shaft 15 by changing the shape of a caulking section 29 with the projecting portion 28 fitted in the hole 27. On one end side of the driven shaft 15 a coil spring 34 is wound to give a unidirectional biased rotating force to the driven shaft 15 and the sliding-element receiver 30. Furthermore, one end of a terminal section 35 connected to the signal line 33 is exposed into the connector section 20. An external connector not shown is mounted to the connector section 20, and the terminal section 35 is connected to the contact of the external connector.

In the throttle position sensor 10 of the aforesaid constitution, after the insertion of the sensor body 17 into the accommodating chamber 16 of the housing 11 through the opening 18 at the time of assembling, the opening 18 is closed with the cover 19, and the thermosetting resin 24 is filled in the gap between the opening 8 and the cover 19 and heated to be set. At this time, the air expanded within the accommodating chamber 16 escapes at the attachment chamber 21 to the outside via the communicating hole 25 provided in the partition wall 12, restraining a pressure rise within the accommodating chamber 16 to thereby prevent the generation of bubbles in the thermosetting resin 24.

The throttle position sensor 10 thus assembled is installed to the case 2 by screws not shown, with the mounting surface 22 held in close contact with the case 2 of the throttle valve 1 through the gasket 23 as shown in FIG. 1. In such a mounted state, since one end of the communicating hole 25 made in the partition wall 12 is located in the attachment chamber 21 which is mounted in a closed state in the case 2 of the throttle valve 1, no foreign substance, such as water and dust, will enter the accommodating chamber 16 through the communicating hole 25. It is, therefore, possible to reliably prevent corrosion of the contact section of the sensor body 17 disposed within the accommodating chamber 16.

In the present embodiment of the position sensor thus constituted, since the entry of such foreign substances as water and dust into the accommodating chamber 16 of the housing 11 can be reliably prevented, the sensor body 17 housed in the accommodating chamber 16 is separated from the foreign substances as water and dust. A high-reliability throttle position sensor 10, therefore, is obtainable.

It is to be noticed that in the above embodiment the communicating hole 25 of the housing 1 is formed straight, but the shape of the communicating hole 25 is not limited thereto and can be made in a conical form tapering as it goes from the attachment chamber 21 side toward the accommodating chamber 16, and also can be tapered as it extends from the accommodating chamber 16 side toward the attachment chamber 21 by providing a step between the attachment chamber 21 and the accommodating chamber 16. In this case, a foreign substance, if present in the attachment chamber 21, will not enter the communicating hole 25 from the attachment chamber 21, and moreover the air can smoothly flow from the accommodating chamber 16 to the attachment chamber 21.

Furthermore, in the above-described embodiment, the housing 11 mounted to the throttle valve 1 with the connector section 20 directed downward has been described as an example; however, the housing 11 may be mounted to the throttle valve 1 with the connector section 20 directed upward or sideward.

Although a preferred embodiment of the invention has been illustrated and described herein it will be understood that the invention is susceptible of various modifications and adaptations within the spirit and scope of the appended claim.

What is claimed is:

1. A position sensor for a device having a main body, the main body including an opening and a drive shaft extending from the main body into the opening, the position sensor comprising:

a housing including a partition wall defining a central opening, the housing defining an attachment chamber on a first side of the partition wall, and an accommodating chamber on a second side of the partition wall, each of said attachment chamber and said accommodating chamber including an opening communicating with an exterior of the housing, wherein when said housing is attached to said main body, the opening of said attachment chamber is connected over the opening of the main body, thereby closing the opening of the attachment chamber;

a driven shaft connected to said drive shaft, said driven shaft being disposed in said attachment chamber and rotatably supported on said partition wall;

a sliding-element receiver connected through the central opening in said partitioning wall to said driven shaft, said sliding-element receiver being located within said accommodating chamber, wherein the driven shaft and the sliding-element receiver cooperate to close the central opening of the partition wall;

an insulating substrate disposed adjacent to said sliding-element receiver within said accommodating chamber;

a cover mounted over the opening of said accommodating chamber and attached to the housing with thermosetting resin, thereby sealing the opening of said accommodating chamber; and a communicating hole provided in said partition wall of said housing and connecting said accommodating chamber with said attachment chamber.

2. A position sensor according to claim 1, wherein said communicating hole is tapered between said accommodating chamber toward said attachment chamber.

3. A throttle valve for a motor vehicle comprising:

a case defining an air passage, an insertion hole communicating with the air passage, and a concave section formed on an exterior surface of the case and communicating with the insertion hole;

a drive shaft rotatably connected to the case and extending through the insertion hole, one end of the drive shaft being connected to a drive section which is located in the concave section, and a second end of the drive shaft being connected to a plate disposed in the air passage; and a position sensor comprising:

a housing including a partition wall defining a central opening, the housing defining an attachment chamber on a first side of the partition wall, and an accommodating chamber on a second side of the partition wall, each of said attachment chamber and said accommodating chamber including an opening communicating with an exterior of the housing, wherein said housing is attached to said case such that the opening of said attachment chamber is connected over the concave section of the case, thereby closing the opening of the attachment chamber;

a driven shaft connected to the drive section of said drive shaft, said driven shaft being disposed in said attachment chamber and rotatably supported on said partition wall;

a sliding-element receiver connected through the central opening in said partitioning wall to said driven shaft, said sliding-element receiver being located within said accommodating chamber, wherein the driven shaft and the sliding-element receiver cooperate to close the central opening of the partition wall;

an insulating substrate disposed adjacently and oppositely to said sliding-element receiver within said accommodating chamber;

a cover mounted over the opening of said accommodating chamber and attached to the housing with thermosetting resin, thereby sealing the opening of said accommodating chamber; and a communicating hole provided in said partition wall of said housing and connecting said accommodating chamber with said attachment chamber, whereby the communicating hole provides the only passage out of the accommodating chamber.

4. A throttle valve according to claim 3, wherein said communicating hole is tapered between said accommodating chamber and said attachment chamber.

* * * * *